Nov. 16, 1965 P. F. MAEDER 3,217,992
RECORDER TAPE TRANSPORT AND STORAGE MECHANISM
Filed June 12, 1963 7 Sheets-Sheet 1

INVENTOR.
PAUL F. MAEDER
BY
Dike, Thompson, Bronstein & Mrose
ATTORNEYS

Nov. 16, 1965 P. F. MAEDER 3,217,992

RECORDER TAPE TRANSPORT AND STORAGE MECHANISM

Filed June 12, 1963 7 Sheets-Sheet 2

INVENTOR.
PAUL F. MAEDER
BY
Dike, Thompson, Bronstein & Mrose
ATTORNEYS

Nov. 16, 1965 P. F. MAEDER 3,217,992

RECORDER TAPE TRANSPORT AND STORAGE MECHANISM

Filed June 12, 1963 7 Sheets-Sheet 3

INVENTOR.
PAUL F. MAEDER
BY
Dike, Thompson, Bronstein & Mrose
ATTORNEYS

Nov. 16, 1965 P. F. MAEDER 3,217,992

RECORDER TAPE TRANSPORT AND STORAGE MECHANISM

Filed June 12, 1963 7 Sheets-Sheet 4

INVENTOR.
PAUL F. MAEDER
BY
Dike, Thompson, Bronstein & Mrose
ATTORNEYS

Nov. 16, 1965 P. F. MAEDER 3,217,992

RECORDER TAPE TRANSPORT AND STORAGE MECHANISM

Filed June 12, 1963 7 Sheets-Sheet 5

INVENTOR.
PAUL F. MAEDER
BY
Dike, Thompson, Bronstein & Mrose
ATTORNEYS

INVENTOR.
PAUL F. MAEDER
BY
Dike, Thompson, Bronstein & Mrose
ATTORNEYS

Nov. 16, 1965 P. F. MAEDER 3,217,992

RECORDER TAPE TRANSPORT AND STORAGE MECHANISM

Filed June 12, 1963 7 Sheets-Sheet 7

INVENTOR.
PAUL F. MAEDER
BY
Dike, Thompson, Bronstein & Mrose
ATTORNEYS

United States Patent Office 3,217,992

Patented Nov. 16, 1965

3,217,992
RECORDER TAPE TRANSPORT AND STORAGE MECHANISM

Paul F. Maeder, Rumford, R.I., assignor, by mesne assignments, to Textron Inc., Providence, R.I., a corporation of Rhode Island Filed June 12, 1963, Ser. No. 287,406
8 Claims. (Cl. 242—55.11)

The present invention relates to a tape recorder and, more specifically to a novel tape transport and storing mechanism for a tape recorder.

There has been a need for some time especially in the Government Space Program for a tape recorder capable of recording high frequency instrumentation signals for long periods of time, e.g. 24 hours or more, and which will still meet the small volume and weight requirements necessary for missiles, satellites and aircraft.

With conventional flat tape (usually ¼ inch or more in width) stored on reels the amount of information which can be stored per unit of volume occupied by the stored tape is too small to achieve information storage over the long periods of time required within the minimum volume requirements.

Although relatively long lengths of wire can be stored on spools in a small cubic space, only a relatively small amount of information can be stored on wire per unit of length as compared to tape, because the information is stored only on the surface and with wire the ratio of surface to volume is relatively low. Consequently, with wire wound on spools the amount of information which can be stored per unit of volume occupied is no greater and may be less than with flat tape wound on reels, even though a greater length of wire can be stored in the same unit volume. Also, wire has the disadvantage of having poor frequency response and it is not entirely practical for the high frequencies required for instrumentation recording. Due to its circular cross-sectional shape it does not store information accurately or reliably. Because of this the use of wire for storing information has not been adopted to any great extent.

It is an object of the present invention to provide a novel tape and tape storage arrangement by which more information, especially high frequency information, can be reliably and accurately stored per unit of tape storage volume than has been heretofore possible to store either with wire or flat tap.

This is accomplished by storing tape having a width greater than its thickness, e.g. flat tape, helically and in layers on a spool, the tape being guided to the rotating spool by a guide moving in a direction parallel to the axis of the spool, whereby the tape is wound helically on the spool, the direction of movement of the guide and hence of the tape being reversed to commence succeeding layers, the width of the tape being less than one tenth the diameter of the spool at least where its direction is reversed. If the width of the tape is not less than one tenth of the diameter of the spool where reversal occurs, the tape is apt to crimp on reversal, thereby causing a thick uneven spot.

Preferably, the width of the tape is not substantially greater than about $\frac{1}{16}''$, more preferably not greater than about $\frac{1}{32}''$. This permits the use of smaller spool diameters so that a larger amount of tape can be stored in a smaller total volume occupied by the tape and spool.

The tape is moved from a first spool, e.g., supply spool, on which it is helically stored in the form of layers past a recorder and/or erase and/or playback head to a second spool, e.g., rewind spool, about which it is helically wound and stored in the form of layers. A guide mechanism is provided which moves along the length of the rotating second spool in a direction parallel to the axis thereof and guides the tape to the rotating second spool to helically store the tape on the spool. The rate of movement of the guide along the second spool is controlled with relation to the rate of rotation of the second spool and the width of the tape to provide the desired helix and to ensure against overlapping of laterally adjacent, helically wound coils of each layer.

Other objects and advantages of the present invention will be apparent from the following description and the accompanying drawings in which.

Figure 1:
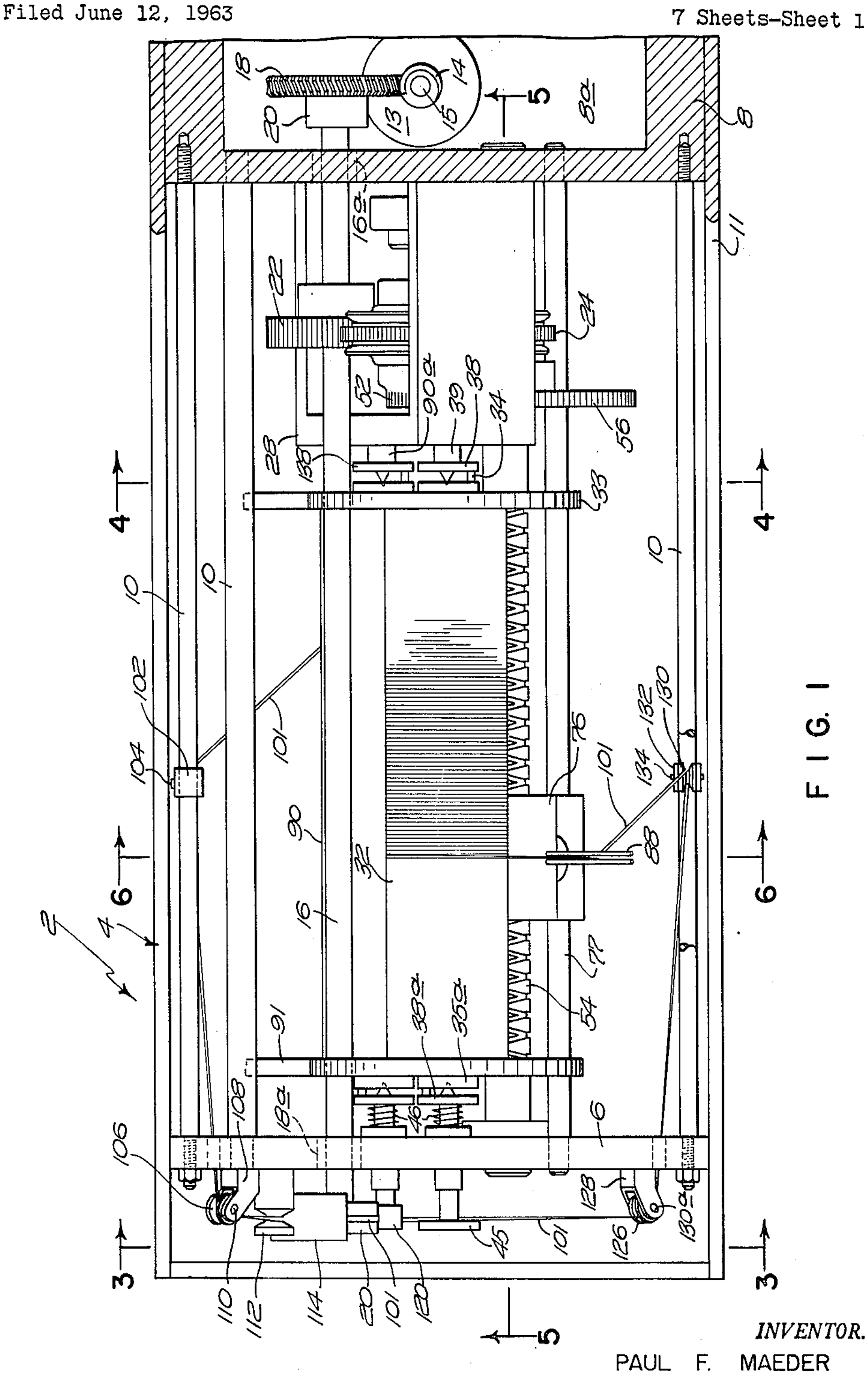
FIG. 1 is a front elevation of a tape recorder embodying an embodiment of the tape transport and storage mechanism of the present invention.

With reference to the drawings, the recorder 2 comprises a frame 4 made up of a plate 6 and a parallel hollow block 8 spaced from each other and held together by a plurality of spacing rods 10.

The frame is contained in a removable casing 11.

The hollow block 8 houses a motor 13 to the drive shaft 15 of which is attached a worm 14 which drives a capstan shaft 16 through a worm gear 18 affixed by means of hub 20 to the shaft 16, the shaft 16 being rotatably mounted in the block 8 and the plate 6 by means of bearings **16*a* and 18*a* respectively and having attached to the other end a tape driving capstan 20**.

Figure 7:
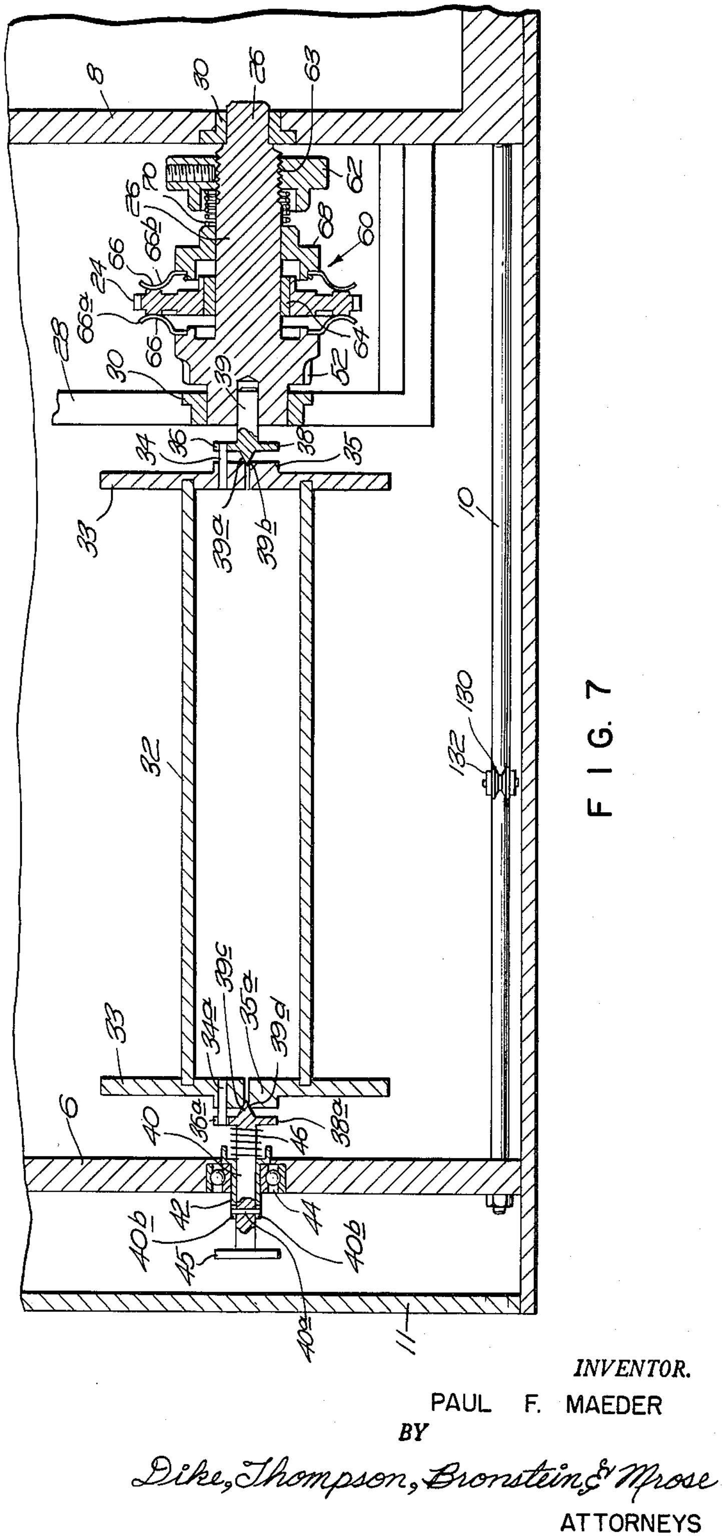
FIG. 7 is a section taken along the line 7—7 of FIG. 2.
Figure 10:
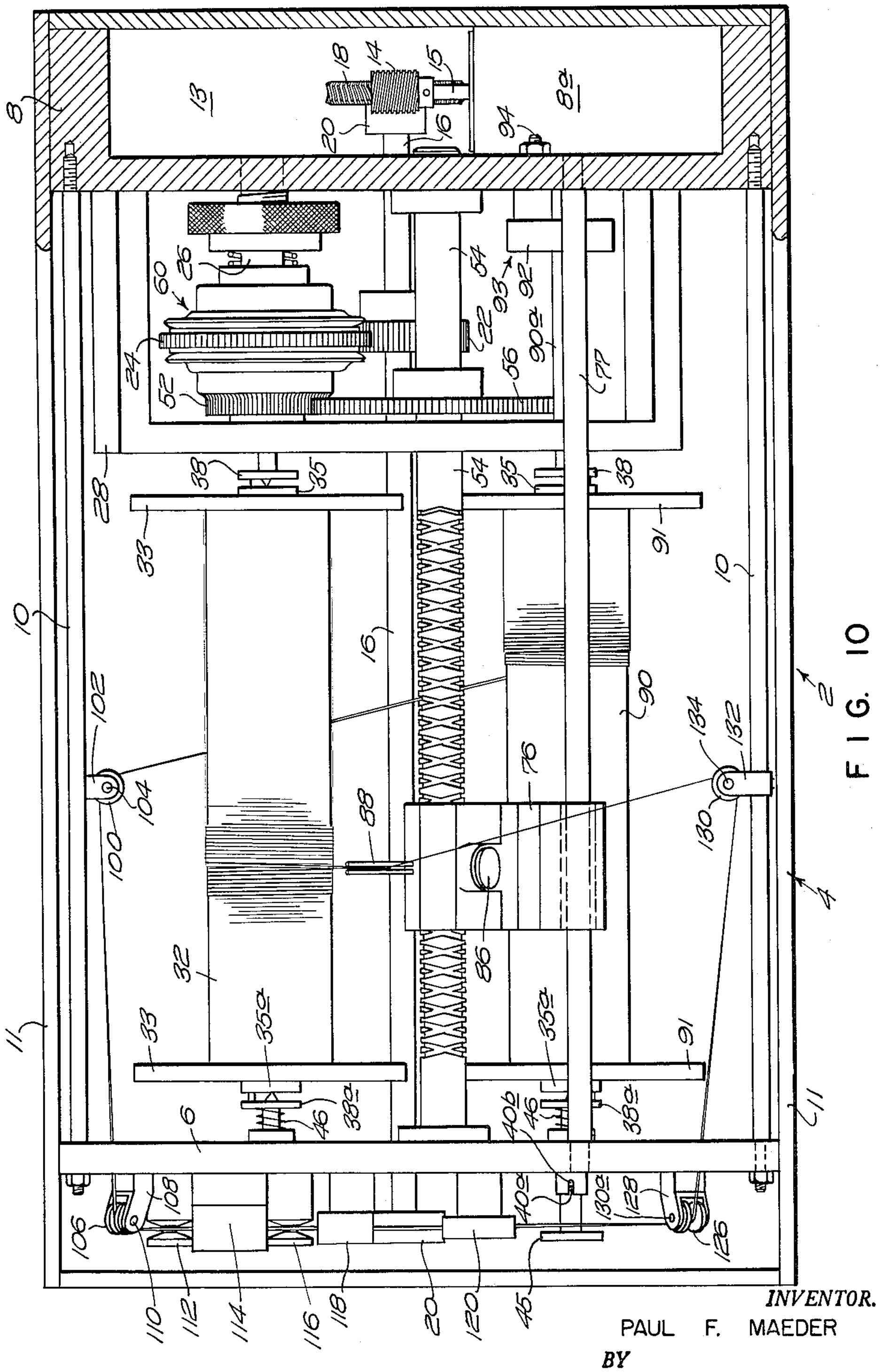
FIG. 10 is a bottom plan view of FIG. 1.

The shaft 16 has affixed thereto a gear 22 which drives a gear 24 which in turn drives a re-wind spool shaft 26 rotatably mounted in block 8 and the hollow U-shaped bridge 28 by means of bearings 30 (see FIGS. 2 and 7), the bridge 28 being affixed to the block 8 as shown and forming a gear box or housing.

Gear 24 drives shaft 26 through a slip clutch arrangement 60 (see FIG. 7) of which gear 24 forms a part and which permits slippage between the gear 24 and the shaft 26 for reasons to be hereinafter explained. Gear 24 is slidably and rotatably mounted on the shaft 26 by means of a bearing 64 (see FIG. 7) and rotates shaft 26 through frictional contact with two pressure discs 66, one of which, **66*a*, is rigidly attached to shaft 26 and the other of which, 66*b*, is attached to a disc 68 which is slidably mounted on shaft 26, as shown, and is urged to the left against a friction surface on gear 24 by means of a spring 70 biased between disc 68 and nut 62 screwed on a threaded portion 63 of the shaft 26. The pressure exerted by the pressure disc 66*b* on the gear 24 can be adjusted by adjustment of the nut 62. Preferably the disc 68 is provided with a pin (not shown) which cooperates with a longitudinal slot (not shown) in the shaft 26** and into which the pin extends to permit the disc to slide longitudinally on the shaft but not to rotate with respect to the shaft.

Figure 4:
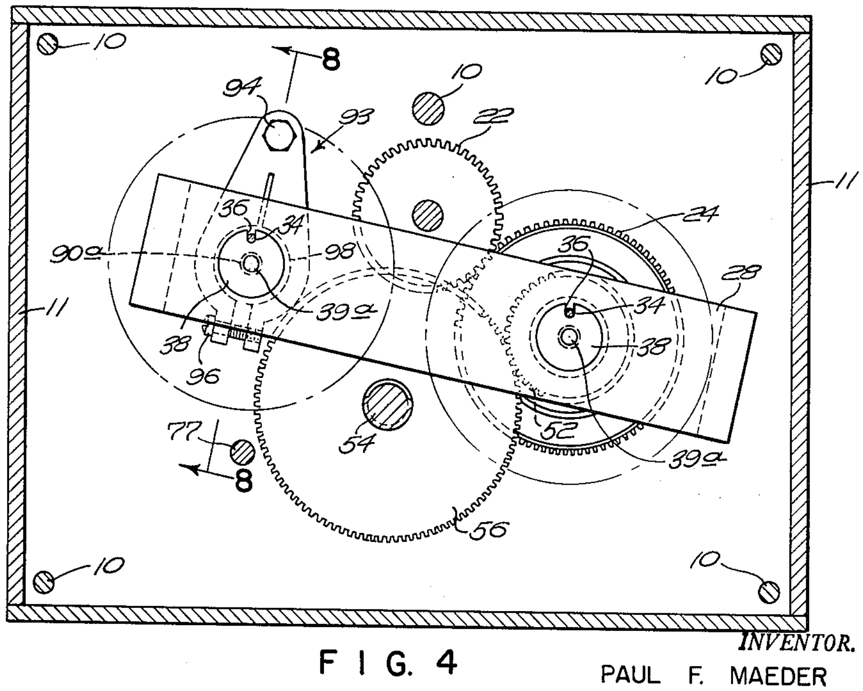
FIG. 4 is a section taken along the line 4—4 of FIG. 1.

The shaft 26 drives or rotates re-wind spool 32 having end flanges 33 by means of a pin 34 (see FIGS. 4 and 7) which is eccentrically mounted on a centrally disposed end hub 35 at the end of spool 32 and which is received in a slot 36 in the periphery of a plate or flange 38 of a stub shaft 39 affixed to or integral with the shaft 26 to couple the shaft 26 and re-wind spool 32. The coupling between the shaft 26 and spool 32 also includes a conical shaped bearing pin 39a which extends from the center of plate 38 into a complementary conical shaped bearing recess 39b in the center of hub 35 as shown.

The other end of the spool 32 is rotatably mounted on the plate 6 by means of a stub shaft 40 which is slidably received within a sleeve 42, which in turn is rotatably mounted in plate 6 by means of a bearing 44, the stub shaft 40 being coupled to the spool 32 by means of a pin 34a which is eccentrically mounted on end hub 35a at the other end of spool 32 and which is received in a slot 36a in the periphery of the flange or plate 38a affixed to or integral with the stub shaft 40. The coupling between the stub shaft 40 and the re-wind spool 32 also includes a conical shaped bearing pin 39c which extends from the center of plate 38a into a conical shaped complementary bearing recess 39d in the hub 35a. The stub shaft 40 has a pin 40a which extends therethrough into longitudinal slots 40b in the edge of sleeve 42 so that although the shaft is slidable axially in the sleeve they rotate together.

The stub shaft 40 is urged to the right by the spring 46 to a position in which the pin 34a is received in the slot 36a and the bearing pin 39c is forced into complementary recess 39d. The right hand force exerted by the pin 39c on the spool urges the spool to the right and holds the pin 34 in the slot 36 and the bearing pin 39a in the bearing recess 39b. The spool 32 can be removed from the recorder by forcing the shaft 40 to the left against the force of spring 46 by means of handle 45 until the pin 34a moves out of the slot 36a and the bearing pin or point 39c moves out of the recess 39d.

Affixed to shaft 26 is a gear 52 which drives a screw shaft 54 (see FIGS. 2 and 5) through a gear 56 affixed to the screw shaft 54. Screw shaft 54 is rotatably mounted in the block 8 and the plate 6 by means of bearings 58 (see FIG. 5) and 58a respectively. It has a right hand set of threads 54b and a left hand set of threads 54c criss-crossing each other, as shown.

Rotation of the screw shaft 54 drives a tape guide 76 mounted on the screw shaft and guide shaft 77 back and forth along the re-wind spool 32 in a direction parallel to the axis of the re-wind spool.

Figure 6:
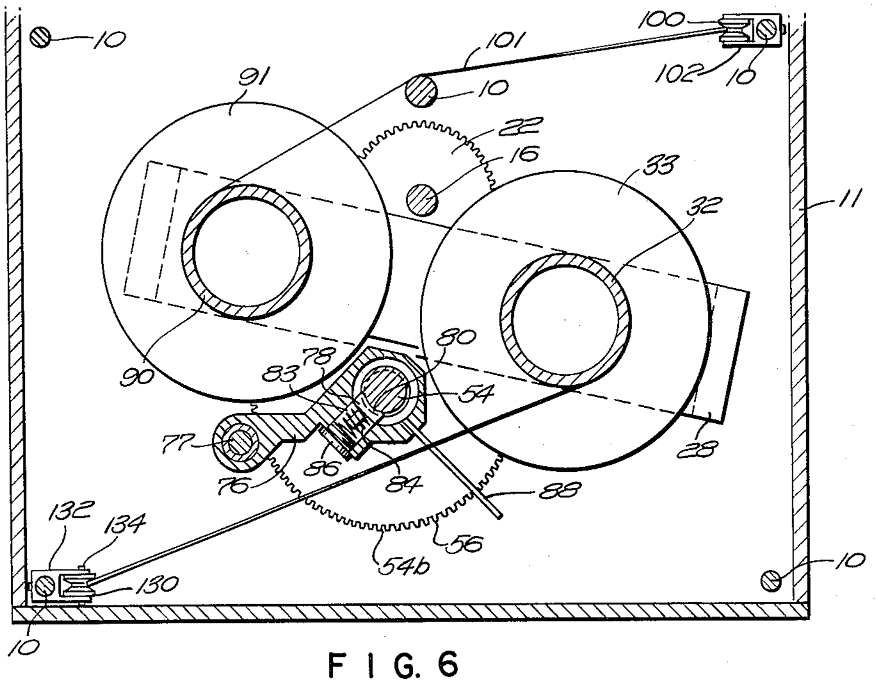
FIG. 6 is a section taken along the line 6—6 of FIG. 1.

This is accomplished by means of a screw shaft follower 78 (see FIG. 6), the tooth 80 of which is urged into the depression of the threads of the screw shaft by means of a spring 84. The follower 78 is slidably mounted in a cavity 83 in the guide 76, as shown in FIG. 6, the cavity having a cap 86 against which the spring 84 is biased. In FIG. 6, the follower is located between the threads of the right hand set of threads 54b so the guide 76 is being moved to the right by rotation of the drive screw 54. When the guide reaches the end of its right hand traverse and the follower reaches the end of the right hand set of threads, the follower is forced to move into the corresponding end of the reverse left hand set of threads, whereafter the guide is driven in a reverse left-hand direction. The corresponding ends of the two sets of threads are interwoven in that the end of the right hand thread is connected with the corresponding end of the left hand thread so as to automatically move the follower axially and guide it from one set of threads to the other when it reaches the end of its traverse.

The guide 76 is reversed before the tape can be distorted from its normal laying pattern by contact with the inside face of the end flange 33 of the re-wind spool 32. The end flanges 33 extending radially beyond the circumference of 32 may be omitted and the ends of 32 reduced in diameter with the tape being reversed at the reduced diameter end portions to eliminate any tendency of thick spots developing at the tape reversal areas.

Figure 5:
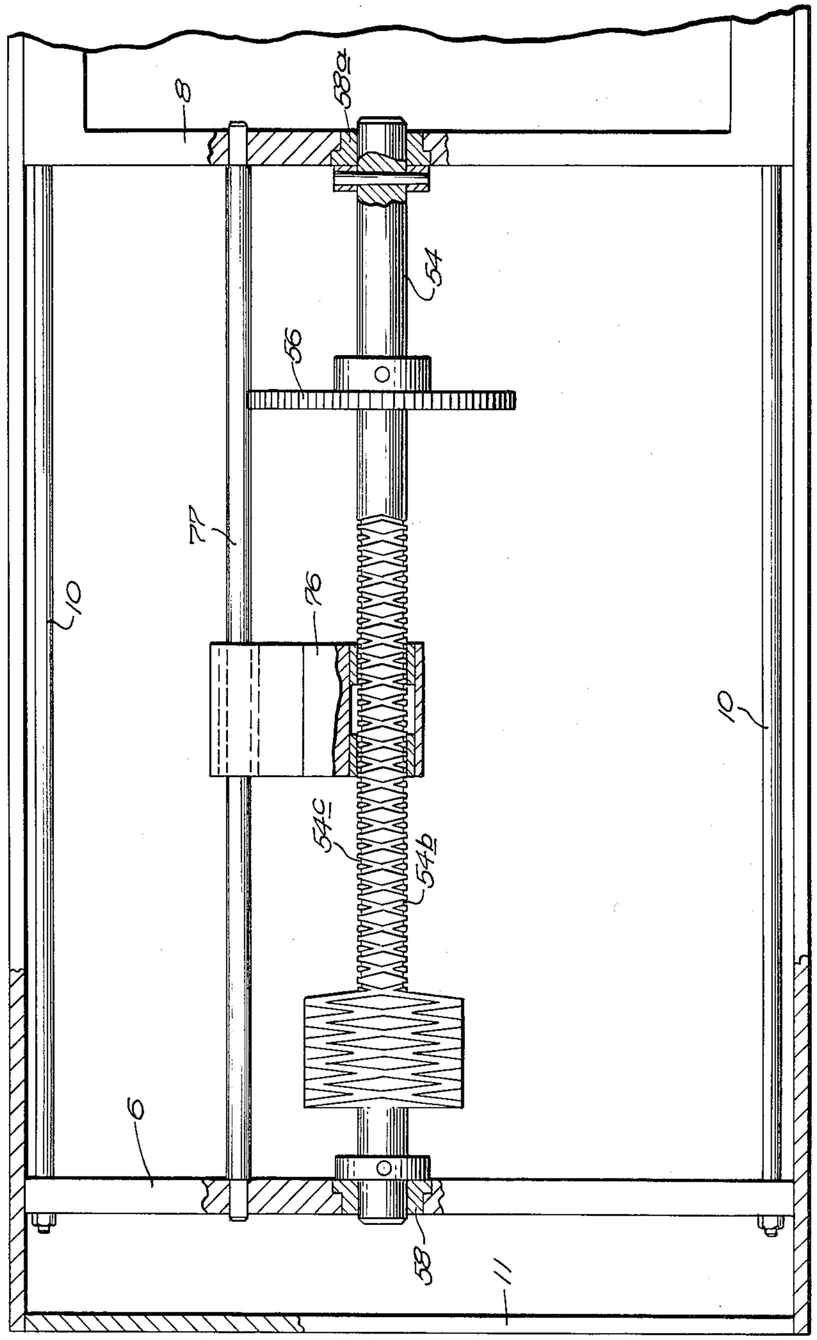
FIG. 5 is a section taken along the line 5—5 of FIG. 1 showing the guide drive screw shaft with an end portion developed to show how the ends of the reverse threads interweave to reverse the movement of the guide.

The guide rod 77 is mounted on the plate 6 and block 8, as shown in FIG. 5.

The guide 76 is provided with a set of twin tape guiding pins 88 extending downwardly as shown in FIGS. 1 and 6, the guide pins being spaced apart from about .002 to .003 of an inch more than the thickness of the tape so that the thickness of the tape can be received between the two pins with a clearance of between about .002 and .003 inch. The invention is not limited however to any particular distance between the pins so long as they are close.

Figure 8:
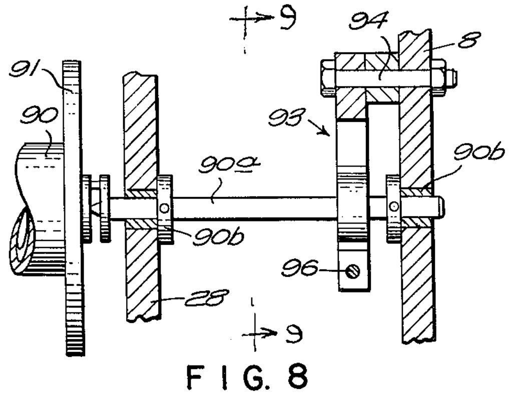
FIG. 8 is a section taken along the line 8—8 of FIG. 4.
Figure 9:
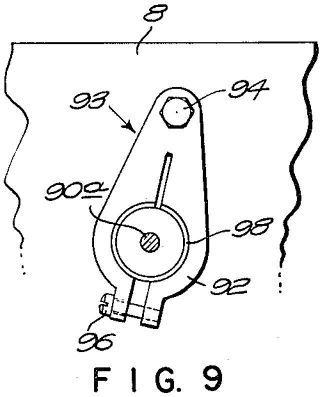
FIG. 9 is a section taken along the line 9—9 of FIG. 8.
Figure 11:
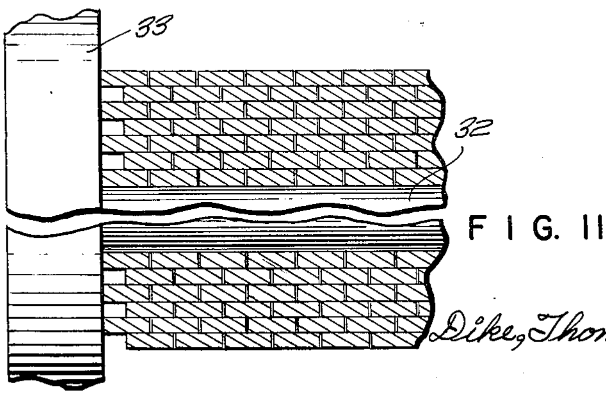
FIG. 11 is an enlarged section in elevation of an end portion of the re-wind spool showing the layers of helically wound coils of tape.

The supply spool 90 (see FIGS. 2, 4, 6, 8 and 9) having flanges 91 is spaced horizontally and slightly upwardly from the re-wind spool 32, is located between the bridge 28 and the plate 6 and is rotatably mounted in plate 6 by a stub shaft arrangement identical to that by means of which the re-wind spool 32 is rotatably mounted in plate 6. The other end of the supply spool 90 is rotatably mounted in the bridge 28 and block 8 by means of the same stub shaft arrangement by which the re-wind spool 32 is mounted in 28 and 8 except that instead of having a drive shaft 26, clutch arrangement 60 and gear 24 attached to the end thereof, the stub shaft 90a (see FIG. 8) of supply spool 90 extends through bridge 28 to the block 8, is rotatably mounted in the bridge and block by means of bearings 90b and is provided with a pony brake arrangement 93 comprising a brake shoe 92 (see FIGS. 2, 4, 8 and 9) anchored to the block 8 by means of a stud 94 and having an adjusting screw 96 for adjusting the tension of the brake lining 98 about the stub shaft 90a, whereby the degree of braking of the shaft 90a and hence the supply spool 90 can be controlled. Thus, the supply spool 90 is a slave.

It is noted that the U-shaped bridge member 28 is tilted (see FIG. 6) so that both spools can be mounted on the base thereof without unduly increasing the size and hence the weight thereof.

It is also noted that all the gears and the pony brake and clutch arrangements are mounted between the housing or bridge 28 and the block 8, the motor is located in a right hand cavity 8a in the block 8 and the spools are located between the bridge 28 and the plate 6. The tape 101 and the major portion of the tape transport mechanism are located to the left of the plate 6, such portion of the transport mechanism being mounted on the plate.

The tape follows the following path in moving from the supply spool 90 on which it is stored to the re-wind spool 32. It moves from the periphery of the supply spool 90 to the supply spool takeoff guide pulley 100 (see FIGS. 1, 2 and 6) which is rotatably mounted on one of the standoffs 10 by means of a bracket 102 and a shaft 104. The roll 100 changes the attitude of the tape from horizontal to vertical. From the takeoff guide roll 100 it moves through a hole 103 in plate 6 to the corner guide roll 106 which is rotatably mounted on plate 6 (see FIGS. 1, 2, 3 and 6) by means of a bracket 108 and a shaft 110. The tape is moved from corner guide roll 106 to a tape guide standoff 112 rigidly mounted to the plate 6 and from there it is moved in front of the recording and playback heads, shown in the drawings as a single head 114 for purposes of simplification, and thence to the guide standoff 116 which is also mounted rigidly to the plate 6. From 116, it moves around about half of the periphery of a tension roll 118, the periphery of which is biased against the periphery of the rotating capstan 20 by a conventional biasing mechanism (not shown). The pressure roll presses the tape between itself and the rotating periphery of the capstan. The tape emerges from between the tension roll 118 and capstan 20 and moves about halfway around the periphery of the capstan and between the capstan periphery and a second pressure roll 120, the periphery of which is also biased against the periphery of the capstan by a conventional biasing mechanism (not shown). The pressure of the two pressure rolls 118 and 120 urges the tape against the rotating capstan periphery to cause the rotating capstan to pull the tape from the supply spool 90 along the path referred to above. The capstan comprises an outer driving sleeve 122 (see FIG. 3) which may be made of rubber or metal and an inner sleeve 124 which is attached to the capstan shaft 16. The tape emerges from between the second pressure roll 120 and the capstan 20 and moves partially around the periphery of the second pressure roll 120 to a second corner guide roll 126 which is rotatably mounted by means of a bracket 128 and shaft 130a to the plate 6. The tape moves from the pulley 126 to a re-wind spool feed guide roll 130, which is rotatably mounted on one of the standoffs 10 by means of a bracket 132 and a shaft 134, and from the guide pulley 130 it passes between the pins 88 on the guide 76 as shown in FIGS. 1 and 6 and then moves to the underside of the periphery of the rotating re-wind spool 32.

The rotating capstan moves the tape from the supply spool to the capstan whereas the rotation of the re-wind spool attempts to pull the tape from the capstan onto the periphery of the re-wind spool at a greater rate than the rate at which the capstan moves the tape so that there is a tension in the tape between the capstan and the re-wind spool. Because of this there is a slipping between the gear 24 and the pressure discs 66 (FIG. 7) of the re-wind spool driving shaft 26 which drives the re-wind spool 32. This arrangement assures that there is tension in the tape between the capstan and re-wind spool at all times during operation of the recorder which assures that the tape will be wound on the re-wind spool evenly and without any bumps. The pressure of the pressure disc 66b (FIG. 7) against gear 24 is adjusted so that this slippage will occur before the tape becomes elongated or breaks. Slippage occurs at all times during operation of the recorder.

Figure 2:
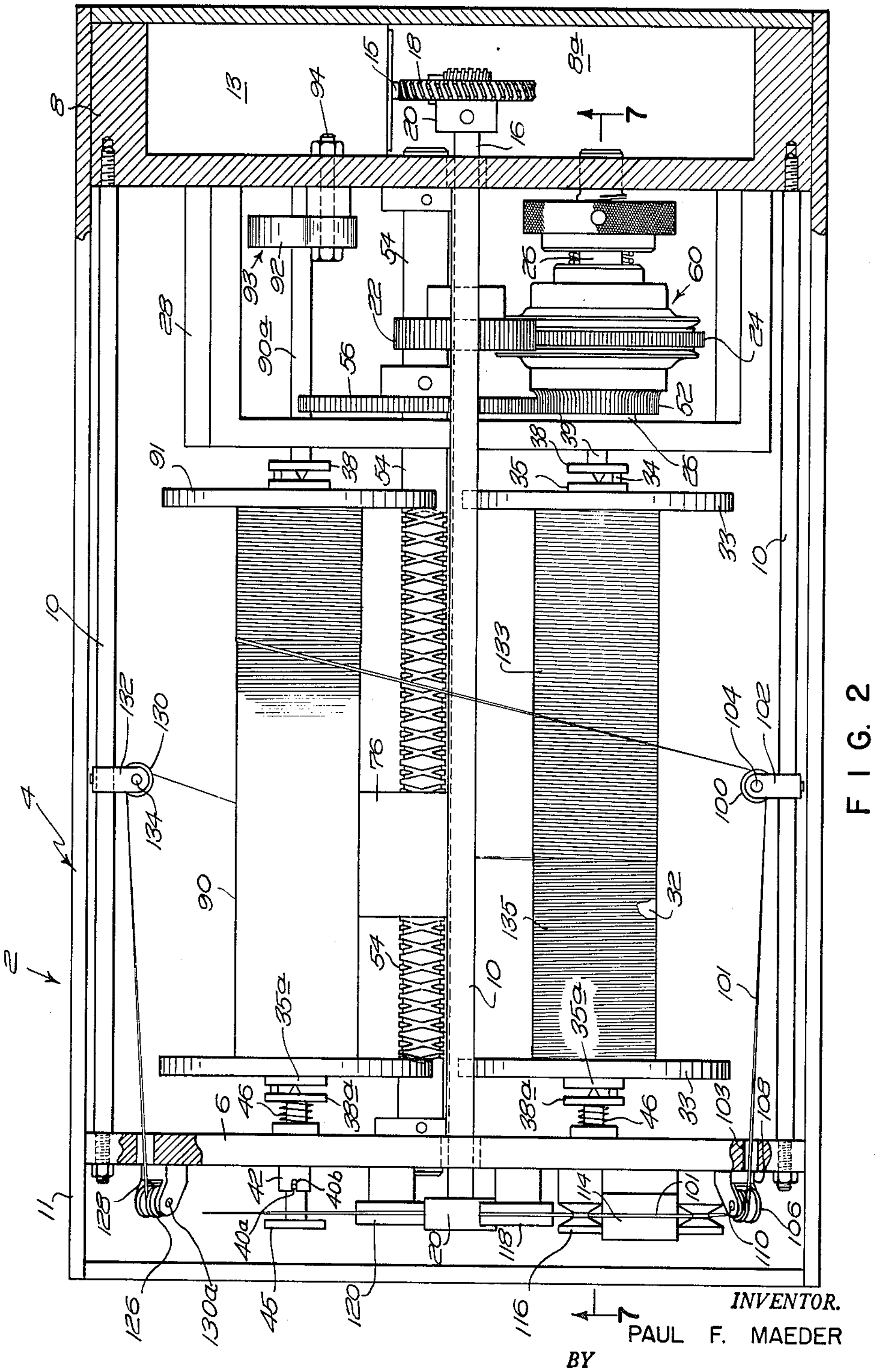
FIG. 2 is a top plan view of FIG. 1.
Figure 3:
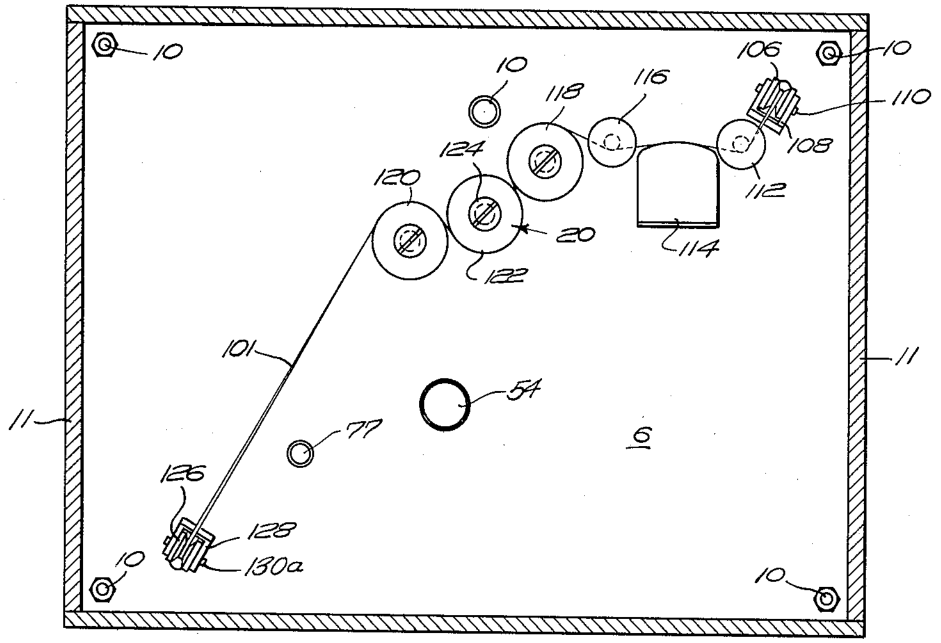
FIG. 3 is a section taken along the line 3—3 of FIG. 1.

The movement of the guide 76 parallel to the axis of the re-wind spool 32 causes the tape to be wound on the spool in the form of a helix extending from one end of the spool to the other and upon reversal of the movement of the guide another helical layer 133 is laid on top of the first layer 135 (see FIG. 2). The direction of the second helix is opposite from the direction of the first helix with relation to the axis of the spool.

The pitch of the threads of the screw shaft and the relative sizes of the gears 56 and 52 are selected to provide the helical shape desired so long as the guide 76 and consequently the tape which it carries moves a distance not less than the width of the tape per revolution of the re-wind spool in order to ensure against the adjacent coils of each spiral layer overlapping each other. In the embodiment shown in the drawings the tape is $\frac{1}{32}$ inch wide. In any event it should be less than one tenth of the diameter of the spool on which it is helically wound at least where the tape direction is reversed. Preferably the tape width is $\frac{1}{16}$ inch or less although it can be greater with corresponding sacrifice in the minimum space occupied for storing any given amount of intelligence. The smaller the width of tape the smaller can be the spool diameter and consequently the greater the saving in space.

In certain cases, especially for satellite use, a second guide member and screw shaft therefor (like the ones shown) and a second drive for rotating spool 90 (like that shown for spool 32) will be provided for helically winding the tape on the supply spool from the rewind spool for playback with a clutch for selectively driving either of the spools through gear 22. When one spool is being driven the other is disconnected by the clutch from the driving gear 22 and acts as a slave. In such case, the drive for spool 90 would conveniently occupy the space shown as being occupied by the pony brake and any conventional means may be used for braking each of the spools when it is acting as a slave. Also, in such case the motor is reversible or other means are employed for rotating the capstan in an opposite direction past the playback head and recording head when the supply spool is being driven and the tape is moved from the rewind to the supply spools. For purposes of simplification the second guide and screw shaft therefor to helically wind the tape on the supply spool 90 from the re-wind spool, and the drive for the spool 90, as well as the clutch for selectively driving the spools have been omitted. With the arrangement shown in the drawings the re-wind spool and supply spool must be interchanged for playback. As aforesaid, for purposes of simplicity, both the playback and record heads (also the erase head if one is used) is shown as a single head 114.

I claim:

1. In a tape recorder a first spool, a second spool, means for moving a tape having a width which is greater than its thickness from said first spool to said second spool, said means for moving said tape comprising means for rotating said second spool to wind and store the tape on said second spool, guide means for guiding said tape to said second spool, means for moving said guide means relative to said second spool and hence the tape being guided to said second spool in a direction parallel to the axis of said second spool while the second spool is rotated to thereby cause said tape to be wound helically upon said second spool, means for reversing the direction of movement of said guide relative to said second spool and hence said tape on said spool, the width of the tape being less than $\frac{1}{10}$ of the diameter of the spool at least where the direction of the tape is reversed, said means for moving said guide comprising a screw shaft on which said guide is mounted for driving said guide in said direction parallel to the axis of said re-wind spool, means for rotating said screw shaft and a follower mounted on said guide and adapted to cooperate with said rotating screw shaft to move said guide in response to rotation of the screw shaft, the speed at which said guide is moved being determined at least in part by the pitch of the screw thread on the screw shaft and by the rate of rotation of said screw shaft relative to the rate of rotation of said second spool, said screw shaft being driven from said second spool through a drive coupling, said drive coupling comprising gear means for providing a ratio between the rate of rotation of said screw shaft and the rate of rotation of said second spool at which ratio said guide is moved in said parallel direction at a rate which is at least equal to the width of the tape per revolution of the second spool, a tape driving capstan for pulling said tape off from said first spool, means for driving said capstan, means to drive said second spool at a rate which is greater than the rate at which the capstan moves said tape and means for providing slippage between the capstan and second spool drives.

2. In a tape recorder a first spool, a second spool, means for moving a tape having a width which is greater than its thickness from said first spool to said second spool, said means for moving said tape comprising means for rotating said second spool to wind and store the tape on said second spool, guide means for guiding said tape to said second spool, means for moving said guide means relative to said second spool and hence the tape being guided to said second spool in a direction parallel to the axis of said second spool while the second spool is rotated to thereby cause said tape to be wound helically upon said second spool, means for reversing the direction of movement of said guide relative to said second spool and hence said tape on said spool, the width of the tape being less than $\frac{1}{10}$ of the diameter of the spool at least where the direction of the tape is reversed, said means for moving said guide comprising a screw shaft on which said guide is mounted for driving said guide in said direction parallel to the axis of said re-wind spool, means for rotating said screw shaft and a follower mounted on said guide and adapted to cooperate with said rotating screw shaft to move said guide in response to rotation of the screw shaft, the speed at which said guide is moved being determined at least in part by the pitch of the screw thread on the screw shaft and by the rate of rotation of said screw shaft relative to the rate of rotation of said second spool, said screw shaft being driven from said second spool through a drive coupling, said drive coupling comprising gear means for providing a ratio between the rate of rotation of said screw shaft and the rate of rotation of said second spool at which ratio said guide is moved in said parallel direction at a rate which is at least equal to the width of the tape per revolution of the second spool, including a tape driving capstan for pulling tape off said first spool, the rotation of said second spool causing the tape to be pulled from said capstan onto said second spool, and means for providing tension in the tape between said capstan and said second spool at all times during movement of the tape.

3. In a tape recorder a first spool, a second spool, means for moving a tape of greater width than thickness from said first spool to said second spool, said last mentioned means including means for rotating said second spool to wind and store the tape on said second spool, guide means for guiding said tape to said second spool, guide means for guiding said tape away from said first spool, means for moving said second spool guide means, and hence the tape being guided to said second spool, relative to said second spool and independently of said first spool guide means in a direction parallel to the axis of said second spool while the second spool is rotated to thereby cause said tape to wind helically upon said second spool, said means for moving said second spool guide means relative to said second spool comprising means for moving the second spool guide means relative to said second spool at a rate which is at least equal to the width of the tape per revolution of the second spool, means for reversing the direction of movement of said second spool guide means relative to said second spool and hence said tape on said spool, the width of the tape being less than 1/10 of the diameter of the spool at least where the direction of the tape is reversed.

4. In a tape recorder, a first spool, a second spool, means for moving a tape having a width which is greater than its thickness from said first spool to said second spool, said means for moving said tape comprising means for rotating said second spool to wind and store the tape on said second spool, guide means for guiding said tape to said second spool, guide means for guiding said tape away from said first spool, means for moving said second spool guide means and hence the tape being guided to said second spool, relative to said second spool and independently of said first spool guide means in a direction parallel to the axis of said second spool while the second spool is rotated to thereby cause said tape to be wound helically upon said second spool, means for reversing the direction of movement of said second spool guide means relative to said second spool and hence said tape on said spool, the width of the tape being less than 1/10 of the diameter of the spool at least where the direction of the tape is reversed.

5. In a recorder according to claim 4, the width of said tape being not substantially greater than 1/16 inch.

6. In a recorder according to claim 4, said means for moving said second spool guide means comprising a screw shaft on which said second spool guide means is mounted for driving said second spool guide means in said direction parallel to the axis of said re-wind spool, means for rotating said screw shaft and a follower mounted on said second spool guide means and adapted to cooperate with said rotating screw shaft to move said second spool guide means in response to rotation of the screw shaft.

7. In a recorder according to claim 6, the speed at which said second spool guide means is moved being determined at least in part by the pitch of the screw thread on the screw shaft and by the rate of rotation of said screw shaft relative to the rate of rotation of said second spool, said screw shaft being driven from said second spool through a drive coupling, said drive coupling comprising gear means for providing a ratio between the rate of rotation of said screw shaft and the rate of rotation of said second spool at which ratio said second spool guide means is moved in said parallel direction at a rate which is at least equal to the width of the tape per revolution of the second spool.

8. A recorder according to claim 4, said means for moving said tape also including a tape driving capstan for pulling said tape off said first spool.

References Cited by the Examiner

UNITED STATES PATENTS

| | | | |
|---|---|---|---|
| 2,132,548 | 10/1938 | Stockwell et al. | 242—100 |
| 2,420,671 | 5/1947 | Little | 242—54 |

MERVIN STEIN, *Primary Examiner.*

UNITED STATES PATENT OFFICE

CERTIFICATE OF CORRECTION

Patent No. 3,217,992 November 16, 1965

Paul F. Maeder

It is hereby certified that error appears in the above numbered patent requiring correction and that the said Letters Patent should read as corrected below.

In the grant, lines 2 and 3, for "assignor, by mesne assignments, to Textron Inc., of Providence, Rhode Island, a corporation of Rhode Island," read -- assignor, by mesne assignments, to Leesona Corporation, of Warwick, Rhode Island, a corporation of Massachusetts, --; line 12, for "Textron Inc., its successors" read -- Leesona Corporation, its successors --; in the heading to the printed specification, lines 4 to 6, for "assignor, by mesne assignments, to Textron Inc., Providence, R. I., a corporation of Rhode Island" read -- assignor, by mesne assignments, to Leesona Corporation, Warwick, R. I., a corporation of Massachusetts --.

Signed and sealed this 20th day of September 1966.

(SEAL)
Attest:

ERNEST W. SWIDER
Attesting Officer

EDWARD J. BRENNER
Commissioner of Patents